United States Patent Office 3,030,777
Patented Apr. 24, 1962

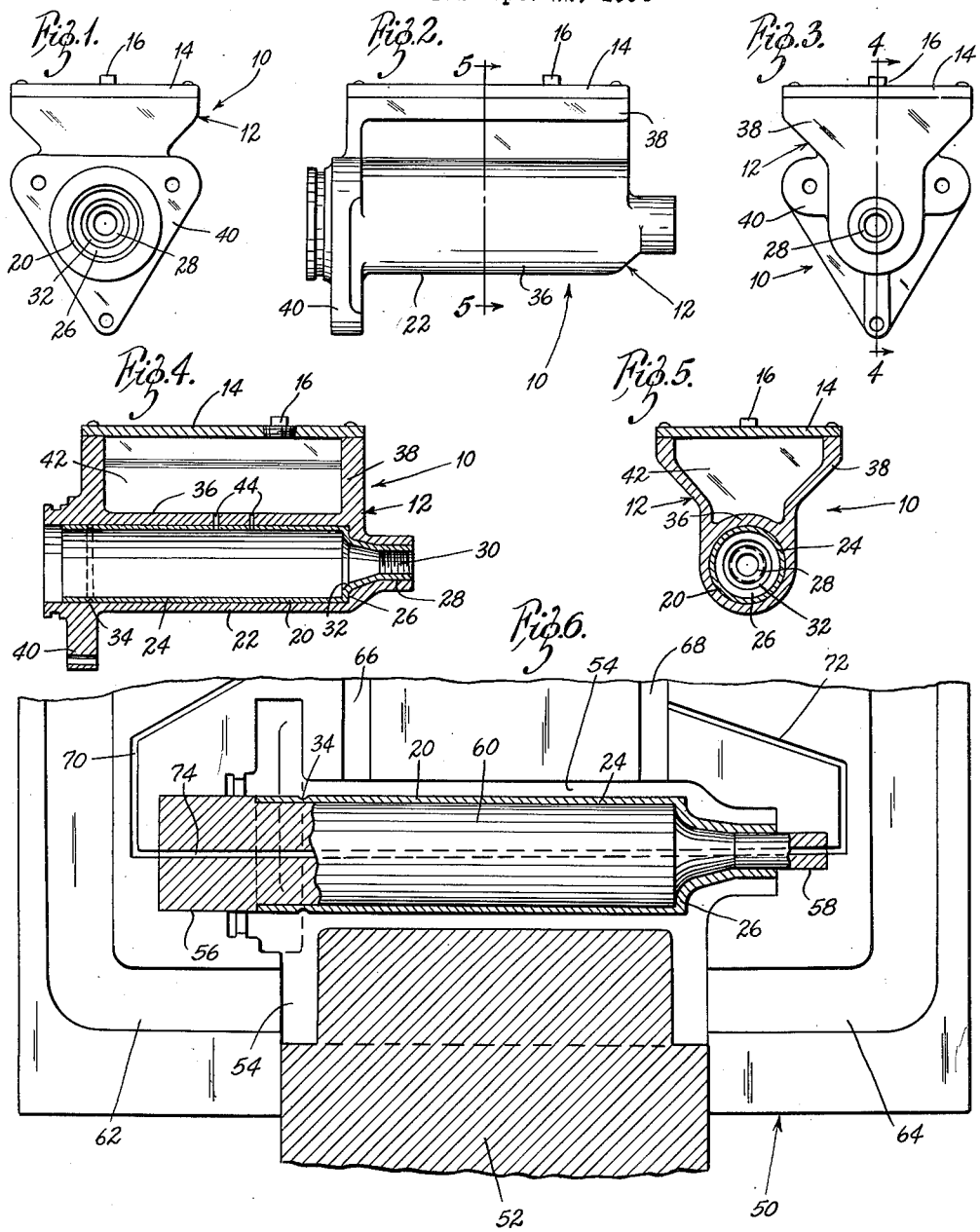

3,030,777
MASTER HYDRAULIC CYLINDER
CONSTRUCTION
Edward Henry Springmeier, Jennings, Mo.
(7 Queen Ann Drive, Hazelwood, Mo.)
Filed Sept. 22, 1954, Ser. No. 457,759
3 Claims. (Cl. 60—54.6)

The present invention relates to hydraulic cylinders, and more particularly to a novel master cylinder which incorporates a check valve for use in hydraulic braking systems and the like.

The invention contemplates a master cylinder construction which, while retaining certain features and advantages thereof, still represents an improvement over the disclosures of my copending applications, Serial Nos. 44,526, now Patent No. 2,725,719, and 307,428, now abandoned, filed August 16, 1948, and September 2, 1952, respectively. The present application is, therefore, to be regarded as a continuation-in-part of the two applications above identified.

The advantages, both from the standpoint of manufacture and from the standpoint of maintaining operating efficiency of hydraulic brake master cylinders, which accrue to a cast cylinder construction incorporating a preformed cylindrical liner have been discussed in each of my previous applications. There appears no necessity for repeating such a discussion here. Attention is directed, however, to one difficulty which has been experienced with master cylinders constructed as previously disclosed, namely, the difficulty of providing an accurate and efficient valve seat in a construction which will prevent leakage of hydraulic fluid under pressure around the inner or valve end of the sleeve-like liner.

In the first of my previous applications above mentioned, the inner end of a cylindrical liner is imbedded in metal which has been cast therearound, with the seat being subsequently machined in the cast metal. In the second application, a preformed metal ring defining the desired seat is "push-fitted" in the end of the cylindrical sleeve so as to avoid the necessity of machining the casting in the vicinity of the seat. Neither of these constructions has proved to be wholly satisfactory in a master cylinder which desirably incorporates a reduced passage portion in axial communication with the main cylinder and which has an annular valve seat formed at this juncture.

The present invention completely overcomes the difficulties outlined above by providing a preformed liner which, itself, includes, not only a main cylindrical portion, but also an end portion of reduced diameter for direct connection with an external conduit. This liner also incorporates an integral valve seat at the juncture of the main cylinder portion and the end portion.

From the foregoing, it is apparent that, as in my previous inventions, the primary object of the present invention is to provide a master cylinder unit which consists of a light weight casting formed about and bonded to a preformed liner having a bore which presents a nonporous, accurate, and long wearing surface to the cup of the piston to be used therein.

Another object of the present invention is to provide a master cylinder unit having a preformed liner adapted for direct, nonleaking connection with an external conduit.

Another object of the invention is to provide a master cylinder unit which includes a preformed liner having an integral valve seat formed therein.

The foregoing and additional objects and advantages will be apparent from the following description taken in conjunction with the accompanying drawing, in which:

FIGURE 1 is a left end elevational view of a master cylinder unit constructed in accordance with the teachings of the present invention;

FIGURE 2 is a side elevational view thereof;

FIGURE 3 is a right end elevational view thereof;

FIGURE 4 is a longitudinal sectional view taken generally along the line 4—4 of FIGURE 3;

FIGURE 5 is a transverse sectional view taken generally along the line 5—5 of FIGURE 2; and FIGURE 6 is an enlarged interior side elevational view of one of two mold sections which may be employed in producing the article of the present invention, the view also illustrating in vertical section a reservoir core and a preformed cylinder in appropriate relative disposition for receiving molten metal in performing one step in a process of manufacture.

Referring to the drawings more particularly by means of reference numerals, the numeral 10 indicates generally a master cylinder constructed in accordance with the teachings of the present invention. The structure of the cylinder 10 is clearly depicted in FIGURES 1 through 5 of the drawings and comprises a body 12 provided with a cover 14 having a removable plug 16.

Directing attention to the body 12, it will be observed that this element of the master cylinder 10 comprises a sleeve-like liner 20 encased in a housing or casing 22. The liner 20 is preferably formed from a metal alloy susceptible to appropriate heat treatment adapted to provide a durable and substantially impervious wear surface on the inside. Various alloys of aluminum have been found to meet the characteristics desired in the liner 20.

As to its shape, the liner 20 includes a main cylindrical portion 24 which is open at one end and which terminates at a shoulder portion 26 at the other end. Beyond the shoulder 26, the liner 20 has its diameter progressively reduced to a desired size for connection with an external conduit. Thus, in the illustrated embodiment of the invention, an end portion 28 is provided with internal threads 30. Preferably the liner 20 is fabricated from seamless tubing, the end portion 30 being formed by a swaging operation which increases the wall thickness sufficiently for ample accommodation of the threads 30. A seat 32, annular in form, is provided, preferably by machining, in the shoulder 26 at the juncture of the main cylindrical portion 24 and the end portion 28. In addition, an external groove 34 may be formed in the liner 24 adjacent the open end of the main cylinder portion.

As is clear from FIGURE 4, the liner 20 is fully enclosed in the casing 22, and it will be understood that these elements are firmly bonded together. The casing 22 may be of any suitable material susceptible to being cast or otherwise formed as illustrated in the drawings. Inasmuch, however, as the present invention is not directed particularly to the specific configuration of the casing 22, it is sufficient to note that, in addition to a generally cylindrical portion 36 which surrounds the main cylindrical portion 24 of the liner 20, the casing 22 includes a reservoir portion 38 and a mounting portion 40. The reservoir portion 38 defines a reservoir 42 which, in the finished cylinder 10, is communicated with the interior of the liner 20 by means of holes 44 formed in the cylindrical portions 24 and 36.

The aforementioned bonded engagement between the liner 20 and the casing 22 may be achieved in various ways, and it is to be understood that the present invention is directed primarily to the structural combination above described and which is clearly illustrated in FIGURES 1 through 5 of the drawings. It is clear, therefore, that the liner 20 and the casing 22 may be formed separately, with the former being subsequently pressed or driven into the latter. On the other hand, a preformed liner 20 may be inserted in an appropriate mold and the casing cast around it either in a die-casting process or by pouring. Thus, although FIGURE 6 is illustrative of the latter means of interengaging the two principal elements which comprise the master cylinder 10, other methods and procedures may be employed without altering the inventive concept.

With reference to FIGURE 6, a permanent mold half 50 includes a stationary metal core 52 which cooperates with the mold half 50 and a generally similar mating mold half (not shown) in defining a cavity 54 formed to the desired external shape of the casing 22. In addition to defining the cavity 54, these mating elements also define cylindrical recesses 56 and 58 adjoining opposite ends of the cavity 54. The recesses 56 and 58 are of appropriate size for receiving and firmly retaining opposite ends of a mandrel 60 on which is removably disposed a liner 20 for incorporation in a casing 22.

In addition to the features of conformation above mentioned, the mold half 50, along with its mating mold half (not shown) have formed therein conventional pouring gates 62 and 64, risers 66 and 68, and gas passages 70 and 72, the latter serving to communicate a drilled passage 74 in the mandrel 60 with the risers 66 and 68.

The manner in which a casing 22 may be cast about the preformed liner 20 is obvious from FIGURE 6 and, in addition, has been clearly set forth in my copending applications aforementioned. Preferably, the holes 44, as well as the seat 32, are formed by machining after removal of the mandrel 60 from within the liner 20.

In those instances where it is preferred to insert a liner 20 into a preformed casing 22, it will be understood that a mandrel such as 60 may or may not be used to facilitate the insertion. In either case, however, the seat 32 and holes 44 are preferably formed after the liner 20 is in the casing 22.

Clearly, there has been described a master cylinder unit which fulfills the objects and advantages sought therefor.

It will be understood that the foregoing description and the accompanying drawings have been given only by way of illustration and example. It will further be understood that changes in form of the elements, the rearrangement of parts, or the substitution of equivalent structure, which will be obvious to those skilled in the art, are contemplated as being within the scope of the invention, which is limited only by the claims which follow.

What is claimed is:

1. A master cylinder for hydraulic brakes, comprising an elongated cylinder having a main inner surface finished to receive slidably a pressure piston for the hydraulic brake, one end of the cylinder being of reduced diameter so as to provide a shoulder to receive a back check valve and to seat the same, and within the shoulder to provide a tubular recess of less diameter than that of the main inner surface, to which a liquid line may be connected; the main surface, the shoulder and the tubular recess surface all being continuous and formed in an integral metal mass so that liquid cannot leak from any of them; a hollow liquid reservoir having a surface on its lower part below the liquid containing portion, complementary to at least part of the outer surface of the cylinder, the reservoir and cylinder being attached integrally together; a hole between the interior of the reservoir and the interior of the cylinder, the hole passing through the complemental surfaces of the two, and the said surfaces being sealed together in bonded relation at least around the hole so that liquid passing from the reservoir to the interior of the cylinder cannot leake out between the complemental surfaces.

2. The master cylinder of claim 1, wherein the reservoir includes a hollow cylindrical hole across its lower end, the cylinder being tightly encompassed within the hole and surrounded by the walls thereof.

3. The cylinder of claim 1, wherein there is also a flanged portion adjacent one end of the cylinder, extending transversely thereof, so that the cylinder may be supported thereby.

References Cited in the file of this patent
UNITED STATES PATENTS

| | | |
|---|---|---|
| 1,375,140 | Fasey | Apr. 19, 1921 |
| 2,325,284 | Swift | July 27, 1943 |
| 2,462,139 | Sparkes | Feb. 22, 1949 |
| 2,496,623 | Fragale | Feb. 7, 1950 |
| 2,500,340 | Boulton | Mar. 14, 1950 |
| 2,759,329 | Ponti | Aug. 21, 1956 |